United States Patent [19]

Miyamori et al.

[11] Patent Number: 5,737,720
[45] Date of Patent: Apr. 7, 1998

[54] LOW BIT RATE MULTICHANNEL AUDIO CODING METHODS AND APPARATUS USING NON-LINEAR ADAPTIVE BIT ALLOCATION

[75] Inventors: Shinji Miyamori; Masatoshi Ueno, both of Tokyo, Japan

[73] Assignee: Sony Corporation, Tokyo, Japan

[21] Appl. No.: 327,282

[22] Filed: Oct. 21, 1994

[30] Foreign Application Priority Data

Oct. 26, 1993 [JP] Japan ................................. 5-267250

[51] Int. Cl.$^6$ ................................................. G10L 3/02
[52] U.S. Cl. ........................... 704/229; 704/230; 704/503
[58] Field of Search ........................ 352/27, 37; 369/85; 395/2.38, 2.39

[56] References Cited

U.S. PATENT DOCUMENTS

| | | | |
|---|---|---|---|
| 4,184,049 | 1/1980 | Crochiere et al. | 395/2.38 |
| 5,105,463 | 4/1992 | Veldhuis et al. | 395/2.92 |
| 5,109,417 | 4/1992 | Fielder et al. | 395/2.14 |
| 5,115,240 | 5/1992 | Fujiwara et al. | 341/51 |
| 5,142,656 | 8/1992 | Fielder et al. | 395/2.38 |
| 5,185,800 | 2/1993 | Mahieux | 395/2.91 |
| 5,222,189 | 6/1993 | Fielder | 395/2.38 |
| 5,264,846 | 11/1993 | Oikawa | 341/76 |
| 5,268,685 | 12/1993 | Fujiwara | 341/76 |
| 5,285,476 | 2/1994 | Akagiri et al. | 375/25 |
| 5,301,205 | 4/1994 | Tsutsui et al. | 375/200 |
| 5,375,189 | 12/1994 | Tsutsui et al. | 395/2.38 |
| 5,381,143 | 1/1995 | Shimoyoshi et al. | 341/51 |
| 5,438,643 | 8/1995 | Akagiri et al. | 395/2.1 |
| 5,461,378 | 10/1995 | Shimoyoshi et al. | 341/51 |

FOREIGN PATENT DOCUMENTS

| | | | |
|---|---|---|---|
| 0506394 A2 | 9/1992 | European Pat. Off. | G10L 7/00 |
| 0525809 A2 | 2/1993 | European Pat. Off. | H04B 1/66 |

OTHER PUBLICATIONS

Peter Noll, "Digital Audio Coding for Visual Communication", Proceedings of the IEEE, vol. 83, No. 6, p. 925–943 Jun. 1995.

A. Sugiyama et al., "Adaptive Transform Coding with an Adaptive Block Size (ATC–ABS)", Int'L Conference on Acoustics, Speech & Signal Processing, vol. 2, Apr. 1990 Conference.

M. Fuma et al., "A Single Chip Decompression LSI Based on Atrac for Mini Disc", IEEE Transactions on Consumer Electronics, vol. 39, No. 3, Aug. 1993.

*Primary Examiner*—Allen R. MacDonald
*Assistant Examiner*—Tálivaldis Ivars Smits
*Attorney, Agent, or Firm*—Limbach & Limbach L.L.P.

[57] ABSTRACT

A low bit rate encoder for compression-encoding digital audio signals of a plurality of channels makes use of both the property of the audio signal and the hearing sense of the human being. The encoder includes: an energy detecting section for detecting energies of the digital audio signals every digital audio signals of the respective channel, a bit allocation amount determining section for determining bit allocation amounts to the respective channels on the basis of the detected result, a compression-encoding section for compression-encoding the digital audio signals on the basis of the bit allocation amounts allocated for every respective channel in accordance with the determined bit allocation amounts, and a multiplexing section for multiplexing the compression-encoded signals every respective channels. The bit allocation amount determining means operates to determine bit allocation amounts so that the relationship between the energy and the bit allocation amount of the digital audio signal represents a non-linear characteristic, such that according as energy of the digital audio signal increases, the bit allocation amount increases as a whole. Thus, redundancy of bit allocation amount in compression-encoding of the multi-channel system is eliminated, and high quality compression encoding/decoding can be realized.

4 Claims, 9 Drawing Sheets

LOW BIT RATE MULTICHANNEL AUDIO CODING METHODS AND APPARATUS USING NON-LINEAR ADAPTIVE BIT ALLOCATION

BACKGROUND OF THE INVENTION

1. Field of the Invention

This invention relates to a low bit rate encoder and a low bit rate encoding method for compression-encoding audio signals of multi-channel system, a low bit rate decoder and a low bit rate decoding method for decoding compression-coded signals, and recording media on which signals encoded by such encoder/encoding method are recorded, which are used for cinema film projection systems or stereo or multi-sound acoustic systems such as video tape recorder or video disc player, etc.

2. Description of the Related Art

Various efficient encoding techniques and devices for audio or speech signals, etc. are known.

As an example of the efficient encoding technique, there is a blocking frequency band division system, which is the so called transform coding, for blocking, e.g., an audio signal, etc. in a time domain, to thereby transform signals in the time domain each of blocks into signals on the frequency domain for every block of time (orthogonal transform) thereafter to divide them into signal components in a plurality of frequency bands to encode those signal components every respective frequency band.

Moreover, there can be enumerated sub-band coding (SBC) which is non-blocking frequency band division system in which an audio signals, etc. in the time domain is divided into signal components in a plurality of frequency bands without blocking such signals every unit time thereafter to encode the signals.

Further, there have been proposed efficient coding techniques and devices in which the sub-band coding and the transform coding described above are combined. In this case, e.g., an input signal is divided into signal components in a plurality of frequency bands by the sub-band coding thereafter to orthogonally transform signals for every respective frequency bands into signals in the frequency domain to implement coding to these orthogonally transformed signal components in the frequency domain.

Here, as a filter for frequency band division of the above-described sub-band coding, there is, e.g., a filter of QMF, etc. Such filter is described in, e.g., the literature "Digital coding of speech in subbands" R. E. Crochiere, Bell Syst. Tech. J., Vol. 55, No. 8, 1976. This filter of QMF serves to halve the frequency band into bands of equal bandwidth. This filter is characterized in that so called aliasing does not take place in synthesizing the above-mentioned divided frequency bands at later processing stage.

Moreover, in the literature "Polyphase Quadrature filters-A new subband coding technique", Joseph H. Rothweiler ICASSP 83, BOSTON, filter division technique of equal bandwidth is described. This polyphase quadrature filter is characterized in that division can be made at a time in dividing a signal into signal components in a plurality of frequency bands of equal bandwidth.

Further, as the above-described orthogonal transform processing, there is, e.g., such an orthogonal transform system to divide an input audio signal into blocks by a predetermined unit time (frame) to carry out Fast Fourier Transform (FFT), Discrete Cosine Transform (DCT), or Modified DCT Transform (MDCT), etc. for every respective blocks to thereby transform signals in the time domain into those in the frequency domain.

This MDCT is described in the literature "Subband/Transform Coding Using Filter Bank Designs Based on Time Domain Aliasing Cancellation", J. P. Princen A. B. Bradley, Univ. of Surrey Royal Melbourne Inst. of Tech. ICASSP 1987.

Further, as frequency division width in the case of encoding (quantizing) respective frequency components divided into frequency bands, there is band division in which, e.g., hearing sense characteristic of the human being is taken into consideration. Namely, there are instances where an audio signal is divided into signal components in plural (e.g., 25) bands by a bandwidth such that the bandwidth becomes broader according as frequency shifts to higher frequency band side, which is generally called critical band.

In addition, in encoding data every respective bands at this time, coding by a predetermined bit allocation every respective bands or adaptive bit allocation every respective bands is carried out.

For example, in encoding coefficient data obtained after MDCT processing, coding is carried out by adaptive allocation bit number with respect to MDCT coefficient data obtained by MDCT processing for every respective band for every respective blocks.

As the bit allocation technique and device therefore, the following two techniques and device are known.

For example, in the literature "Adaptive Transform Coding of Speech Signals", IEEE Transactions of Acounstics, Speech, and Signal Processing, vol. ASSP-25, No. 4, August 1977, bit allocation is carried out on the basis of magnitudes of signals every respective bands.

Moreover, for example, in the literature "The critical band coder—digital encoding of the perceptual requirements of the auditory system", M. A. Kransner MIT, ICASSP 1980, there are described the technique and the device in which necessary signal-to-noise ratios are obtained every frequency bands by making used of the hearing sense masking to carry out fixed bit allocation.

Meanwhile, in the efficient compression encoding system for audio signals using subband coding, etc. as described above, such a system to compress audio data by making use of the characteristic of the hearing sense of the human being so that its data quantity becomes equal to about ⅓ has been already put into practice.

It should be noted that there is a system called ATRAC (Adaptive TRansform Acoustic Coding, a Trade Mark of SONY Corporation) used in, e.g., MD (Mini Disc, a Trade Mark of SONY Corporation) as the efficient encoding system of compressing audio data so that its data quantity becomes equal to about ⅕.

However, in the efficient coding system utilizing the characteristic of the hearing sense of the human being, there are instances where a sound of a musical instrument or a voice of a human being, etc. obtained by compression-coding a speech signal thereafter decoded, might be changed from the original sound although such a phenomenon takes place to a little degree. Particularly, in the case where this efficient coding system utilizing the characteristic of the hearing sense is used as a recording format for recording media for which fidelity reproduction of original sound is required, realization of higher sound quality is required.

On the contrary, a format of such an efficient coding system (ATRAC system, etc.) to compress audio signal so that its signal (data) quantity becomes equal to about ⅕ has been already put into practice, and hardware employing such a format is being popularized.

Accordingly, implementation of change or expansion having no compatibility of the format is disadvantageous not only to manufacturers (makers) which have used the format but also to general users.

For this reason, it is expected that high sound quality be attained by encoding or decoding device without changing the format itself.

As the method of realization of higher sound quality except for the above, it is conceivable to mix linear PCM sound into ordinary compressed data. However, since compressed data of the efficient coding system and linear data are different in length of frame and time length per each frame, it is difficult synchronize at the time of reproduction. Accordingly, it is very difficult to use these data of two formats at the same time.

Further, not only in the case of ordinary audio equipment, but also in, cinema film projection system, high definition television, or stereo or multi-sound acoustic system such as video tape recorder or video disc player, etc., audio signals of 4 to 8 channels are being handled. It is also expected that efficient coding to reduce the bit rate would apply to such plural channel systems.

Particularly, in the cinema film, there are instances where, digital audio signals of 8 channels, namely of left channel, left center channel, center channel, right center channel, right channel, surround left channel, surround right channel and sub-woofer channel are recorded. In this case, the above-mentioned efficient coding to reduce bit rate is required.

It is difficult to provide on cinema film an area capable of 8 channels of linearly quantized audio data of sampling frequency of 44.1 kHz and 16 bits as used in so called CD (Compact Disc), etc. Accordingly, compression of the audio data is required.

It should be noted that channels of 8 channel data recorded on the cinema film respectively correspond to left speaker, left center speaker, center speaker, right center speaker, right speaker, surround left speaker, surround right speaker, and sub-woofer speaker, which are disposed on the screen side where, pictures reproduced from the picture recording areas of cinema film are projected by projector.

The center speaker is disposed in the center on the screen side, and serves to output reproduced sound by audio data of center channel. This center speaker outputs the most important reproduced sound, e.g., speech of actor, etc.

The sub-woofer speaker serves to output reproduced sound by audio data of sub-woofer channel. This sub-woofer speaker effectively outputs sound which feels as vibration rather than sound in low frequency band, e.g., sound of explosion, and is frequently used effectively in scene of explosion.

The left speaker and the right speaker are disposed on left and right sides of the screen, and serve to output reproduced sound by audio data of left channel and reproduced sound by audio data of right channel, respectively. These left and right speakers exhibit stereo sound effect.

The left center speaker is disposed between the left speaker and the center speaker, and the right center speaker is disposed between the center speaker and the right speaker. The left center speaker outputs reproduced sound by audio data of left channel, and the right center speaker outputs reproduced sound by audio data of right center channel. These left and right center speakers perform auxiliary roles of the left and right speakers, respectively.

Particularly, in movie-theater having large screen and large number of persons to be admitted, etc., there is the drawback that localization of sound image becomes unstable in dependency upon seat positions. However, the above-mentioned left and right center speakers are added to thereby exhibit effect in creating more realistic localization of sound image.

Further, the surround left and right speakers are disposed so as to surround spectators' seats. These surround left and right speakers serve to respectively output reproduced sound by audio data of surround left channel and reproduced sound by audio data of surround right channel, and have the effect to provide reverberation or impression surrounded by hand clapping or shout of joy. Thus, it is possible to create sound image in more three-dimensional manner.

In addition, since a defect, is apt to take place on the surface of a medium of cinema film, if digital data is recorded as is, missing data occurs to a great degree. Such a recording system cannot be employed from a practical point of view. For this reason, error correcting code ability is the very important.

Accordingly, with respect to the data compression, it is necessary to carry out compression processing to such a degree that recording can be made in the recording area on the film by taking bits for correcting code into consideration.

From facts as described above, as the compression method of compressing digital audio data of 8 channels as described above, there is applied the efficient coding system (e.g., the ATRAC system) to attain sound quality comparable to CD by carrying out optimum bit allocation by taking into consideration the characteristic of the hearing sense of the human being as described above.

However, with this efficient coding system, sound of general musical instrument or voice of the human being, etc. is varied from original sound similarly to the above although such a phenomenon takes place to a little degree. For this reason, in the case where such a system is employed in recording format for which reproduction having fidelity to original sound is required, any means for realizing higher sound quality is required.

This problem always exists as long as in the case where systems except for the above-mentioned efficient coding system is used as multi-channel recording format in the cinema film, irreversible compression system is employed from a viewpoint of ensuring of the recording area.

Moreover, in a system for implementing efficient coding to audio signals of the multi-channel system as described above, data of respective channels are independently caused to undergo compression processing.

For this reason, even if, e.g., a certain one channel is in unvoiced sound state, fixed bit (byte) allocation amount is allocated to that channel.

Giving fixed bit allocation amount to the channel in unvoiced sound state as stated above is redundant.

Moreover, since bit allocation amounts are the same also with respect to a channel of signal of low level and a channel of signal of high level, if bit allocation amounts are evaluated over respective channels, redundant bits exist.

It is considered that particularly in the case where bit allocation amounts are fixed every respective channels, redundancy as described above becomes more conspicuous.

OBJECT AND SUMMARY OF THE INVENTION

With the above in view, an object of this invention is to provide an encoder and an encoding method capable of eliminating redundancy of bit allocation amount in compression-coding in the multi-channel system and of realizing a higher quality of compression-coding, a decoder and a decoding method corresponding thereto, and recording media on which compression-coded signals are recorded.

To achieve the above-mentioned object, in accordance with this invention, there is provided a low bit rate encoder for compression-encoding digital audio signals of a plurality of channels by making use of both the property of the audio signal and the hearing sense the human being, the encoder comprising: energy detecting means for detecting energies of the digital audio signals every digital audio signals of the respective channels; bit allocation amount determining means for determining bit allocation amounts to the respective channels on the basis of the detected result; compression-coding means for compression-coding the digital audio signals on the basis of bit allocation amounts allocated every respective channels in accordance with the determined bit allocation amounts; and multiplexing means for multiplexing the compression-coded signals every respective channels. The bit allocation amount determining means is operative to determine respective bit allocation amounts so that the relationship between energy and bit allocation amount of digital audio signal represents a nonlinear characteristic such that according as energy of the digital audio signal increases, bit allocation amount increases as a whole. Further, variable bit allocation is carried out between channels with respect to samples in the time region and samples in frequency region of the audio signals of a plurality of channels.

In the low bit rate encoder of the first embodiment according to this invention, the energy detecting means is an amplitude information detecting means for detecting amplitude information of digital audio signals of respective channels before undergone compression-coding. Further, the bit allocation amount determining means determines bit allocation amounts to respective channels on the basis of a change at point of time of the amplitude information.

In this case, the bit allocation amount determining means calculates (determines), by a predetermined conversion formula, bit allocation amounts with respect to peak values of amplitude information of respective channels on the basis of the hearing sense characteristic, thus to determine amounts of bits to be allocated to respective channels on the basis of the conversion result.

Moreover, the bit allocation amount determining means respectively determines estimated amounts of bit amounts to be allocated to respective channels from the predetermined conversion formula to allocate bit allocation amounts of respective channels in proportion to the respective estimated amounts to thereby allow the total bit allocation quantity of all channels to be fixed.

On the other hand, the low bit rate decoder of the first embodiment according to this invention includes decoding means for decoding signals of respective channels encoded by the low bit rate encoder of the first embodiment.

Further, in the low bit rate encoder of the second embodiment according to this invention, the energy detecting a means is means for detecting change at a point of time of a predetermined scale factor (normalized value of the two-dimensional areas of time and frequency (block floating units)) with respect to signals of the respective channels, and the bit allocation amount determining means serves to carry out variable bit allocation between channels dependent upon change of scale factors.

Also in low bit rate encoder of the second embodiment, the bit allocation amount determining means calculates (determines), by a predetermined conversion formula, bit allocation amount with respect to change in point of time of sum total of scale factors of respective channels on the basis of the characteristic of the hearing sense of the human being to determine bit amounts to be allocated to the respective channels on the basis of the conversion result.

Further, the bit allocation amount determining means respectively calculates (determines) estimated amounts of bit amounts to be allocated to respective channels from the predetermined conversion formula to allocate bit allocation amounts of respective channels in proportion to respective estimated amounts to thereby allow total bit allocation amount of all channels to be fixed.

In addition, the low bit rate decoder of the second embodiment according to this invention includes decoding means for decoding signals of respective channels encoded by the low bit rate encoder of the second embodiment.

In accordance with this invention, in compression-coding audio data of a plurality of channels, since there is employed an approach to determine bit allocation amounts for respective channels on the basis of changes at a point of time of energies of respective channels thus to carry out compression-coding, bit allocation in correspondence with information amounts can be carried out with respect to respective channels.

In addition, in accordance with this invention, in compression-coding audio data of a plurality of channels, the relationships between energies and bit allocation amounts at respective channels are made non-linear to carry out compression-coding on the basis of the bit allocation amounts. For this reason, it is possible to carry out bit allocation in correspondence with information amounts with respect to respective channels.

DESCRIPTION OF THE PREFERRED EMBODIMENTS

Preferred embodiments of this invention will now be described with reference to the attached drawings.

Figure 1:
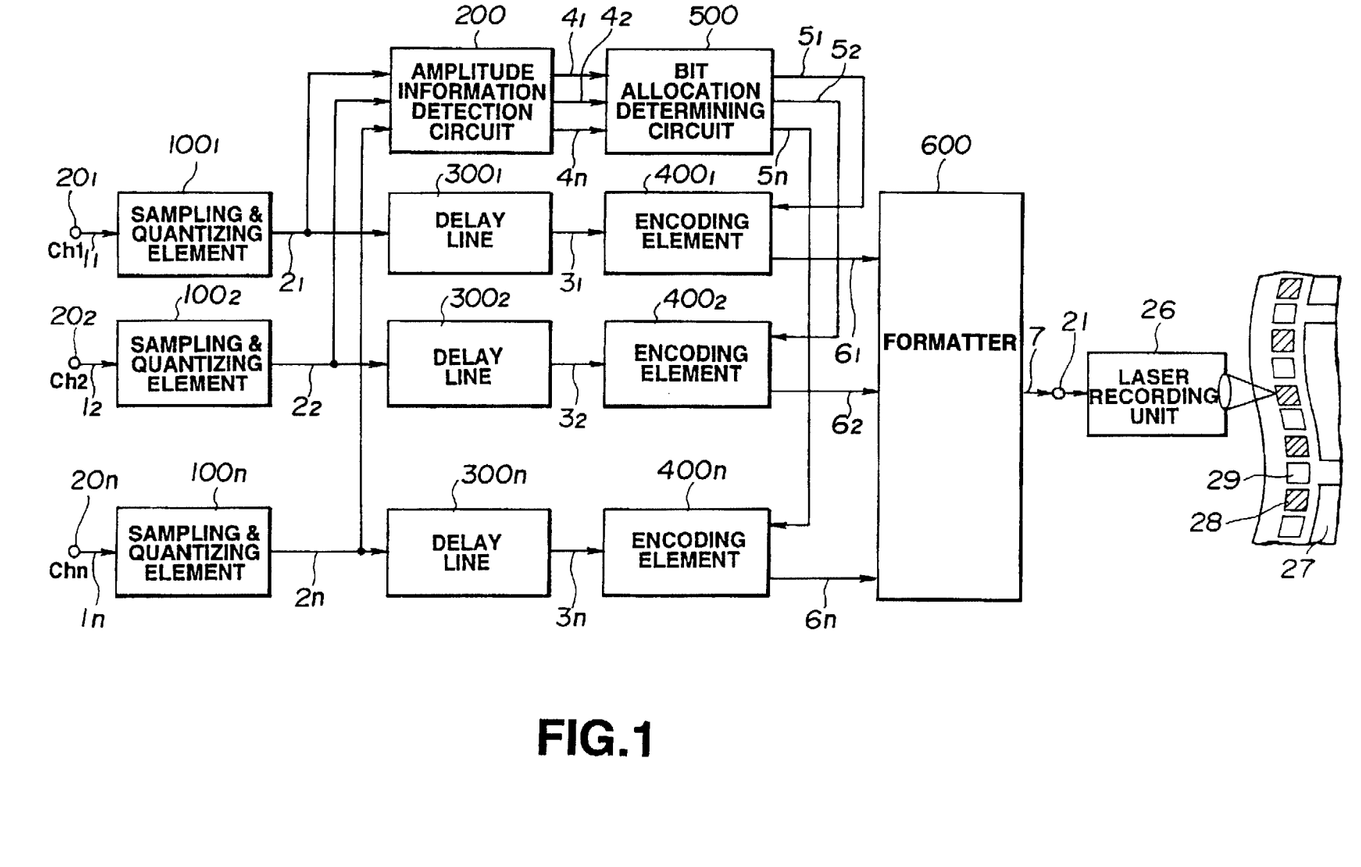
FIG. 1 is a circuit diagram showing, in a block form, outline of the configuration of a low bit rate encoder of a first embodiment according to this invention.
Figure 2:
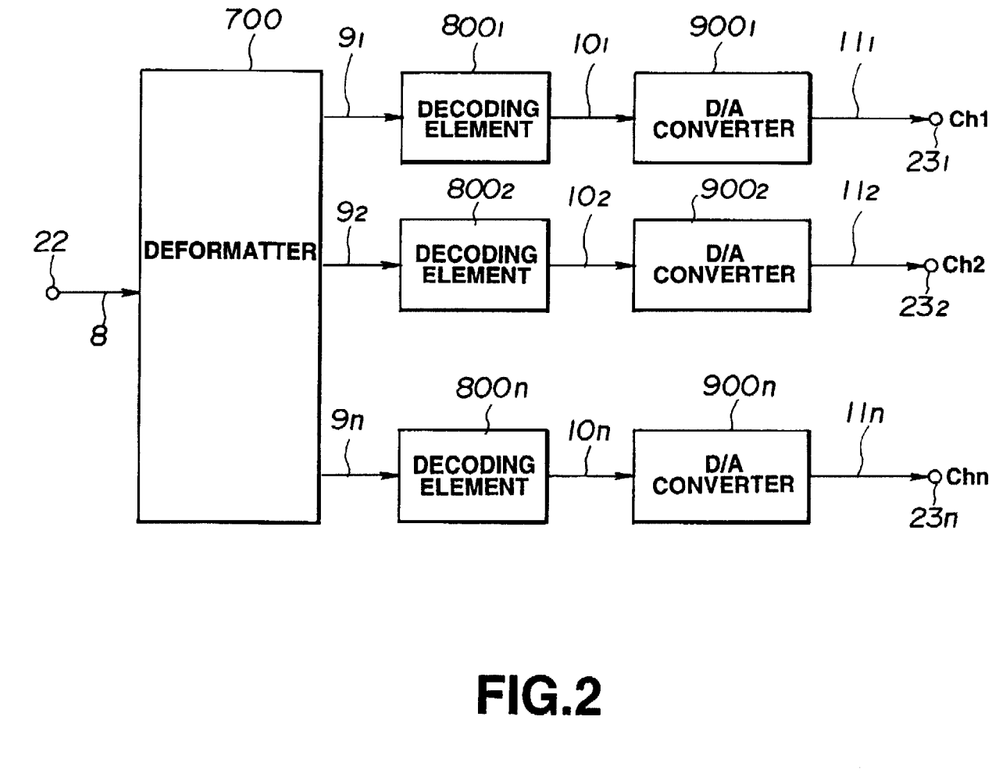
FIG. 2 is a circuit diagram showing, in a block form, outline of the configuration of a low bit rate decoder of first and second embodiments according to this invention.

The fundamental configuration of a first embodiment according to this invention is shown in FIGS. 1 and 2. The configuration of a low bit rate encoder of the first embodiment is shown in FIG. 1, and the configuration of a low bit rate decoder of the first embodiment is shown in FIG. 2.

The configuration of the encoder shown in FIG. 1 will be first described.

Audio signals of a plurality of channels (ch1, ch2, ..., chn) are sent to sampling and quantizing elements $100_1 \sim 100_n$ corresponding to respective channels via input terminals $20_1 \sim 20_n$ and transmission paths $1_1 \sim 1_n$ similarly corresponding to respective channels. At these sampling and quantizing elements $100_1 \sim 100_n$, audio signals of respective channels are converted into quantized signals. Quantized signals from these sampling and quantizing elements $100_1 \sim 100_n$ are sent to amplitude information detecting circuit 200 and delay lines $300_1 \sim 300_n$ via respective transmission lines $2_1 \sim 2_n$.

The amplitude information detecting circuit 200 detects amplitude information from quantized signals of respective channels. Namely, this amplitude information detecting circuit 200 detects peak values of amplitude information for every periods corresponding to the number of samples (hereinafter referred to as time blocks) of audio data processed at a time by encoding elements $400_1 \sim 400_n$ which will be described later to send (transfer) these peak values to bit allocation determining circuit 500 via transmission lines $4_1 \sim 4_n$ corresponding to respective channels. It should be noted that this amplitude information detecting circuit 200 may be of a structure to detect amplitude information by signals from transmission lines $1_1 \sim 1_n$.

The bit allocation determining circuit 500 determines, of conversion, bit allocation amounts for every respective channels from peak values of every respective channel in a manner described later to send (transfer) these bit allocation amounts to respective encoding elements $400_1 \sim 400_n$ via transmission lines $5_1 \sim 5_n$.

Moreover, the delay lines $300_1 \sim 300_n$ delay signals which have been received through transmission lines $2_1 \sim 2_n$ by the time blocks to send (transfer) these delayed signals to respective encoding elements $400_1 \sim 400_n$ through respective transmission lines $3_1 \sim 3_n$.

Respective encoding elements $400_1 \sim 400_n$ carry out a compressing operation for every time block. Bit allocation amounts received through transmission lines $5_1 \sim 5_n$ at this time reflect peak information of signals received through the transmission lines $3_1$ to $3_n$. Respective encoding elements $400_1$ to $400_n$ compress signals which has been received through the transmission lines $3_1 \sim 3_n$ so that their bit allocation amounts are equal to bit allocation amounts which have been received through the transmission lines $5_1 \sim 5_n$ to send (transfer) these compressed signals to formatter 600 via respective transmission lines $6_1 \sim 6_n$.

The formatter 600 implements error correcting processing to the compressed signals for every channel which has been received via the transmission lines $6_1 \sim 6_n$ in accordance with a predetermined format to compose them into a bit stream for transmission or for recording onto recording medium. This bit stream is outputted from output terminal 21 via transmission line 7.

Further, this bit stream is written into predetermined areas 28 on cinema film 27 by laser recording unit 26, for example. In the figure, reference numeral 29 denotes perforations adapted so that sprockets of projector (not shown) for film feeding are engaged therewith. The recording areas 28 are provided, e.g., between the perforations 29.

The configuration of low bit rate decoder of this embodiment will now be described with reference to FIG. 2.

Bit stream composed by the encoder (low bit rate encoder) of FIG. 1 is transmitted or is recorded onto a recording medium. This recorded bit stream is delivered to input terminal 22 via a predetermined reproducing unit (not shown), and is then sent from this input terminal 22 via transmission line 8 to deformatter 700.

This deformatter 700 decomposes the bit stream which has been sent through the transmission line 8 into compressed signals for every respective channel in accordance with a predetermined format. The decomposed compressed signals of every respective channel are sent to decoding elements $800_1 \sim 800_n$ via corresponding to transmission lines $9_1 \sim 9_n$.

Respective decoding elements $800_1 \sim 800_n$ expand the compressed signals which have been sent via the respective transmission lines $9_1 \sim 9_n$ to send them to D/A (digital/analog) converters $900_1 \sim 900_n$ via corresponding respective transmission lines $10_1 \sim 10_n$.

Respective D/A converters $900_1 \sim 900_n$ convert the expanded signals (digital signals) which have been sent via the respective transmission lines $10_1 \sim 10_n$ into analog signals. These signals which are in analog form are outputted as decoded signals of respective channels Ch1~Chn through corresponding transmission lines $11_1 \sim 11_n$ and output terminals $23_1 \sim 23_n$, respectively.

The compression-encoding technique utilized in the low bit rate encoder of this embodiment as described above can be applied to all encoders capable of varying bit rate. Here, the compression-encoding technique for compressing audio signal of stereo 2 channels at a fixed bit rate by making use of the hearing sense characteristic of the human being previously described so that its signal quantity is equal to about 1/5 (e.g., ATRAC system used in so called MD (Mini Disc)) is taken as an example, and a compression-encoding method of this embodiment for allowing the compression at a fixed bit rate to be compression at a variable bit rate will now be described.

Figure 3:
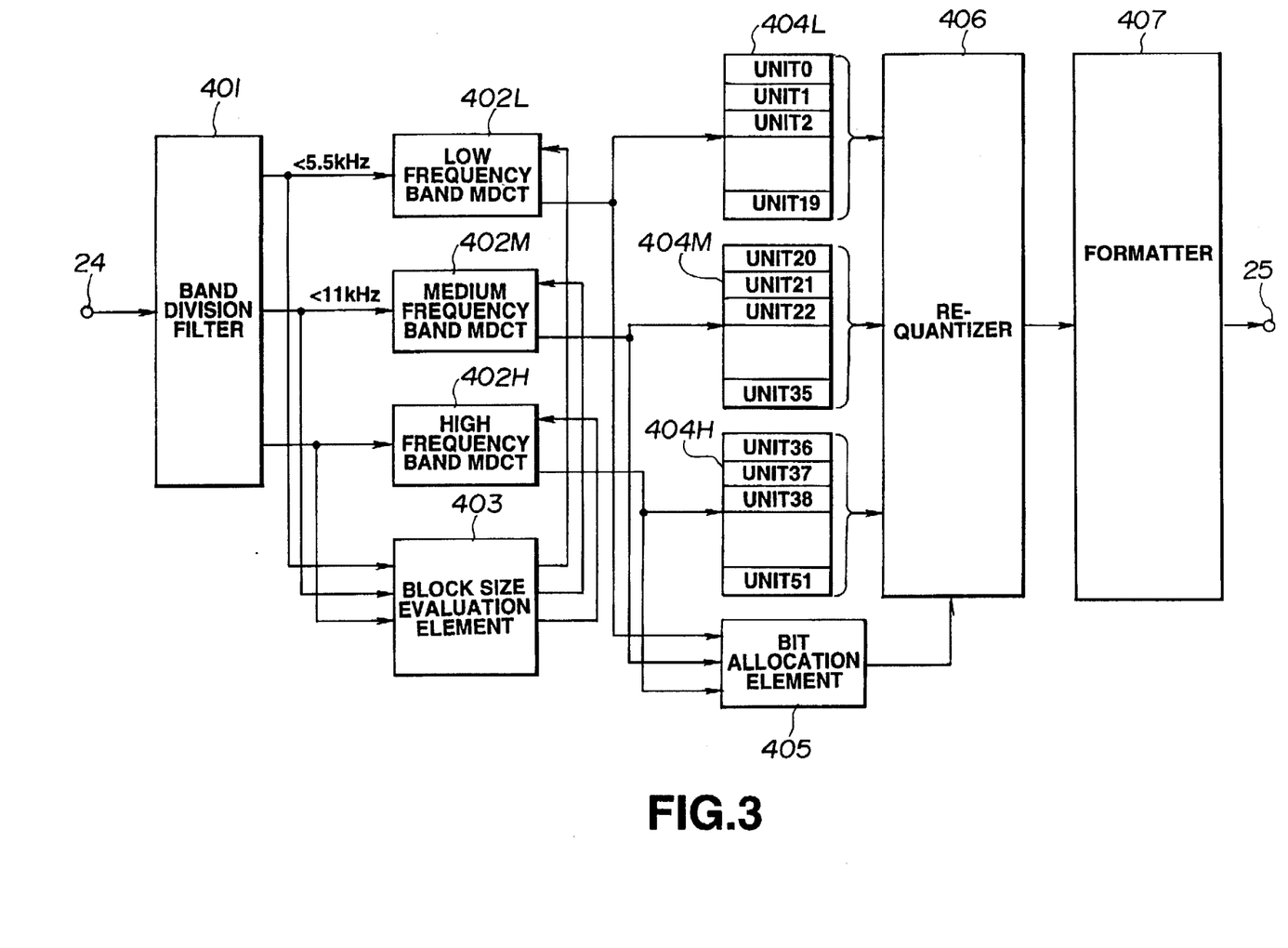
FIG. 3 is a circuit diagram illustrated in a block form for explaining bit allocation in a low bit rate encoder of the ATRAC system and low bit rate encoder of the embodiment according to this invention.

The configuration of encoder to which so called ATRAC system is applied is shown in FIG. 3. It should be noted that the components from frequency band division filter 401 to re-quantizer 406, formater 407 of FIG. 3 correspond to encoding elements $400_1 \sim 400_n$ of respective channels of FIG. 1.

In FIG. 3, sampled and quantized audio data which has been delivered through input terminal 24 is first divided into signals (signal components) in three frequency bands of signal component in lower frequency band of 0~5.5 kHz, signal component in medium frequency band of 5.5 kHz~11 kHz, and signal component in higher frequency band more than 11 kHz (11 kHz~22 kHz).

Among signals in three frequency bands, signals in the lower frequency band from the band division filter 401 are sent to MDCT circuit 402L for performing MDCT (Modified Discrete Cosine Transform) operation, signals in the medium frequency band are sent to MDCT circuit 402M for similarly performing MDCT operation, and signals in higher frequency band are sent to MDCT circuit 402H for similarly performing MDCT operation. Those signals are respectively decomposed into frequency components by these MDCT circuits 402L~402H.

At this time, time block length at the time of implementing the MDCT processing is variable for every respective frequency bands. At the portion where signal suddenly changes, time block length is shortened, thus to increase the time resolution. On the other hand, at the portion where signal is in stationary state, time block length is prolonged to control effective transmission of signal components and quantization noise.

This time block length is determined in advance at block size evaluation element 403. Namely, signals in three frequency bands from the band division filter 401 are sent also to block size evaluation element 403. This block size evaluation element 403 determines time block lengths of the MDCT to send information indicating the determined time block lengths to the MDCT circuits 402L-402H.

Among two kinds of time block lengths at the MDCT processing, the mode using a long time block length is called a long mode, which has block length of time of 11.6 ms. On the other hand, mode using shorter time block length is called short mode, which has block length of time of 1.45 ms in the higher frequency band (more than 11 kHz), and has block length of time of 2.9 ms in the lower frequency band (less than 5.5 kHz) and in the medium frequency band (5.5 kHz to 11 kHz), thus to increase time resolution.

Audio signals decomposed in this way into signal components in the two dimensional regions (which will be called Block Floating Units) of time and frequency are divided into 52 block floating units in total in lower, medium and higher frequency bands, and are normalized for every unit (a determination of scale factors is made).

The bit allocation element 405 analyzes components constituting corresponding audio signal by making use of the characteristic of the hearing sense of the human being. This analyzed result is sent to re-quantizer 406 supplied with signals every respective units from the normalization circuits 404L-404H.

The re-quantizer 406 determines accuracies in coding respective units on the basis of the analyzed result, i.e., carries out determination of word lengths to obtain parameters, and to carry out re-quantization.

Finally, formatter 407 multiplexes respective parameter information and re-quantized spectrum signal for every respective unit in accordance with a predetermined format to thereby provide bit stream. An output of this formater 407 is outputted from output terminal 25.

Operation of encoding as described above is carried out for every unit of sound frame.

Figure 4:
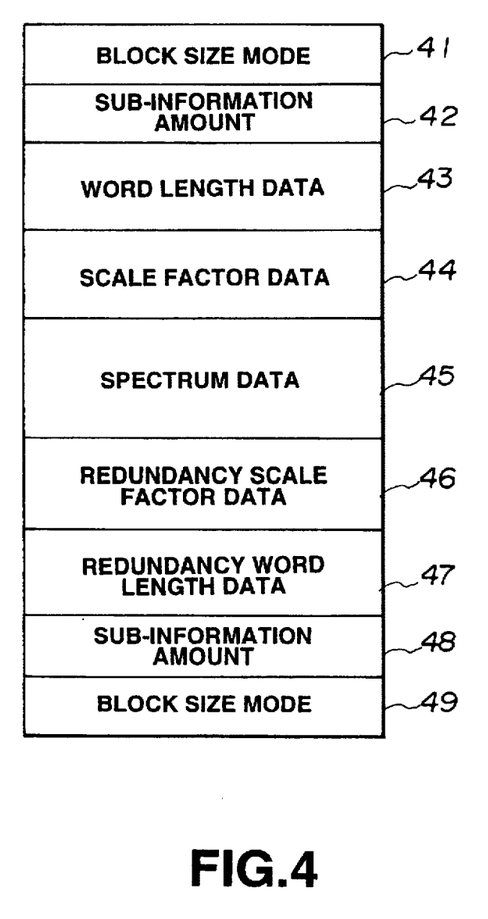
FIG. 4 is a view for explaining the state of recording of data within sound frame.

The state of recording of data within the sound frame 40 is shown in FIG. 4.

In FIG. 4, one sound frame consists of 212 bits. In this sound frame, audio reproduction data of 512 samples and corresponding to one channel is compression-encoded at sampling rate of 44.1 kHz.

The sound frame data of 212 bits consists of block size mode 41, sub-information amount 42, word length data 43, scale factor data 44, spectrum data 45, redundancy scale factor data 46, redundancy word length data 47, lower portion sub-information amount 48, and lower portion block size mode 49.

In data of 212 bits, an double write portion for error correction is included. Namely, this portion consists of redundancy scale factor data 46, redundancy word length data 47, lower portion sub-information amount 48, and lower portion block size mode 49.

In this example, 186 bits of the 212 bits correspond to the portion except for the double write portion, and become equal to 128 kbps in terms of substantial bit rate.

The block size mode is data for recording evaluation result of block size evaluation element 403 of FIG. 3, and its content is as shown in Table 1.

TABLE 1

| FREQUENCY BAND | CODE | MODE | NO. OF FREQUENCY COMPONENTS |
|---|---|---|---|
| HIGH | 00 | SHORT | 32 |
|  | 01 | LONG | 256 |
| MEDIUM | 00 | SHORT | 32 |
|  | 01 | LONG | 128 |
| LOW | 00 | SHORT | 32 |
|  | 01 | LONG | 128 |

As seen from this Table 1, when the block length use mode is the long mode, a signal subject to transform processing is decomposed into 128 frequency components by MDCT operation respectively in lower and medium frequency bands, and is decomposed into 256 frequency components in higher frequency band.

On the other, when the block length use mode is the short mode, a signal subject to transform processing is decomposed into 32 frequency components respectively in lower, medium and higher frequency bands.

Further, the information of amount 1, amount 2 and amount 3 are recorded into sub-information amount 42. Amount 1 indicates the numbers of word lengths and scale factors recorded, amount 2 indicates the number of word lengths doubly written, and amount 3 indicates the number of scale factors doubly written. The content thereof is shown in Table 2.

TABLE 2

| AMOUNT 1 | | AMOUNT 2 | | AMOUNT 3 | |
|---|---|---|---|---|---|
| CODE | NO. | CODE | NO. | CODE | NO. |
| 000 | 20 | 00 | 0 | 000 | 0 |
| 001 | 28 | 01 | 28 | 001 | 8 |
| 010 | 32 | 10 | 44 | 010 | 12 |
| 011 | 36 | 11 | 52 | 011 | 16 |
| 100 | 40 | | | 100 | 24 |
| 101 | 44 | | | 101 | 36 |
| 110 | 48 | | | 110 | 44 |
| 111 | 52 | | | 111 | 52 |

Word lengths indicate word lengths when (signals every) respective units are re-quantized. The content thereof is shown in Table 3.

TABLE 3

| CODE | WORD LENGTH (NO. OF BITS) | CODE | WORD LENGTH (NO. OF BITS) |
|---|---|---|---|
| 0000 | 0 | 1000 | 9 |
| 0001 | 2 | 1001 | 10 |
| 0010 | 3 | 1010 | 11 |
| 0011 | 4 | 1011 | 12 |
| 0100 | 5 | 1100 | 13 |
| 0101 | 6 | 1101 | 14 |
| 0110 | 7 | 1110 | 15 |
| 0111 | 8 | 1111 | 16 |

Scale factors indicate the values when (signals every) respective units are normalized. The content thereof is shown in Table 4.

TABLE 4A

| CODE SF[n] BIT PATTERN | VALUE SCALE FACTOR VALUE | CODE SF[n] BIT PATTERN | VALUE SCALE FACTOR VALUE |
|---|---|---|---|
| 000000 | $0.99999999 \times 2^{-5}$ | 100000 | $0.79370052 \times 2^{6}$ |
| 000001 | $0.62996052 \times 2^{-4}$ | 100001 | $0.99999999 \times 2^{6}$ |
| 000010 | $0.79370052 \times 2^{-4}$ | 100010 | $0.62996052 \times 2^{7}$ |
| 000011 | $0.99999999 \times 2^{-4}$ | 100011 | $0.79370052 \times 2^{7}$ |
| 000100 | $0.62996052 \times 2^{-3}$ | 100100 | $0.99999999 \times 2^{7}$ |
| 000101 | $0.79370052 \times 2^{-3}$ | 100101 | $0.62996052 \times 2^{8}$ |
| 000110 | $0.99999999 \times 2^{-3}$ | 100110 | $0.79370052 \times 2^{8}$ |
| 000111 | $0.62996052 \times 2^{-2}$ | 100111 | $0.99999999 \times 2^{8}$ |
| 001000 | $0.79370052 \times 2^{-2}$ | 101000 | $0.62996052 \times 2^{9}$ |
| 001001 | $0.99999999 \times 2^{-2}$ | 101001 | $0.79370052 \times 2^{9}$ |
| 001010 | $0.62996052 \times 2^{-1}$ | 101010 | $0.99999999 \times 2^{9}$ |

TABLE 4B

| CODE SF[n] BIT PATTERN | VALUE SCALE FACTOR VALUE | CODE SF[n] BIT PATTERN | VALUE SCALE FACTOR VALUE |
|---|---|---|---|
| 001011 | $0.79370052 \times 2^{-1}$ | 101011 | $0.62996052 \times 2^{10}$ |
| 001100 | $0.99999999 \times 2^{-1}$ | 101100 | $0.79370052 \times 2^{10}$ |
| 001101 | $0.62996052 \times 2^{0}$ | 101101 | $0.99999999 \times 2^{10}$ |
| 001110 | $0.79370052 \times 2^{0}$ | 101110 | $0.62996052 \times 2^{11}$ |
| 001111 | $0.99999999 \times 2^{0}$ | 101111 | $0.79370052 \times 2^{11}$ |
| 010000 | $0.62996052 \times 2^{1}$ | 110000 | $0.99999999 \times 2^{11}$ |
| 010001 | $0.79370052 \times 2^{1}$ | 110001 | $0.62996052 \times 2^{12}$ |
| 010010 | $0.99999999 \times 2^{1}$ | 110010 | $0.79370052 \times 2^{12}$ |
| 010011 | $0.62996052 \times 2^{2}$ | 110011 | $0.99999999 \times 2^{12}$ |
| 010100 | $0.79370052 \times 2^{2}$ | 110100 | $0.62996052 \times 2^{13}$ |
| 010101 | $0.99999999 \times 2^{2}$ | 110101 | $0.79370052 \times 2^{13}$ |

TABLE 4C

| CODE SF[n] BIT PATTERN | VALUE SCALE FACTOR VALUE | CODE SF[n] BIT PATTERN | VALUE SCALE FACTOR VALUE |
|---|---|---|---|
| 010110 | $0.62996052 \times 2^{3}$ | 110110 | $0.99999999 \times 2^{13}$ |
| 010111 | $0.79370052 \times 2^{3}$ | 110111 | $0.62996052 \times 2^{14}$ |
| 011000 | $0.99999999 \times 2^{3}$ | 111000 | $0.79370052 \times 2^{14}$ |
| 011001 | $0.62996052 \times 2^{4}$ | 111001 | $0.99999999 \times 2^{14}$ |
| 011010 | $0.79370052 \times 2^{4}$ | 111010 | $0.62996052 \times 2^{15}$ |
| 011011 | $0.99999999 \times 2^{4}$ | 111011 | $0.79370052 \times 2^{15}$ |
| 011100 | $0.62996052 \times 2^{5}$ | 111100 | $0.99999999 \times 2^{15}$ |
| 011101 | $0.79370052 \times 2^{5}$ | 111101 | $0.62996052 \times 2^{16}$ |
| 011110 | $0.99999999 \times 2^{5}$ | 111110 | $0.79370052 \times 2^{16}$ |
| 011111 | $0.62996052 \times 2^{6}$ | 111111 | $0.99999999 \times 2^{16}$ |

Meanwhile, bit allocation element 405 in FIG. 3 mentioned above determines values of word lengths by taking into consideration the hearing sense characteristic of the human being so that bit amount of one sound frame becomes equal to 212 bits in re-quantization. By allowing the value of 212 bits to be variable, it is possible to constitute an encoder of variable length.

Namely, if there is employed a configuration in which output of bit allocation determining circuit 500 of FIG. 1 constituting low bit rate encoder of the embodiment according to this invention is connected to bit allocation element 405 of FIG. 3, it becomes possible to constitute an encoder of variable length.

The operation of bit allocation determining circuit 500 of FIG. 1 connected to bit allocation element 405 of FIG. 3 in this way will now be described with reference to the graph of FIG. 5 and the flowchart of FIG. 6.

Figure 6:
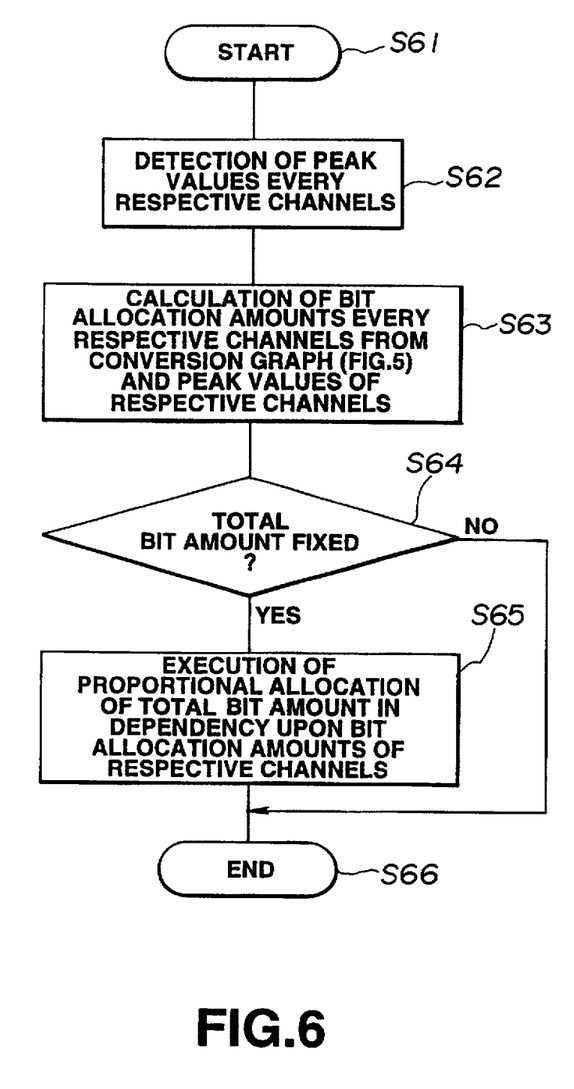
FIG. 6 is a flowchart for explaining the operation of determination of bit allocation amount in the first embodiment.

Initially, when processing operation is started at step S61 of FIG. 6, bit allocation determining circuit 500 detects peak values for every respective channel at step S62. Generally, peak values correspond to energies of audio signals in respective channels.

Then, at step S63, bit allocation amounts corresponding to the determined peak values are calculated. For this calculation, correspondence graph of peak value/bit allocation amount constructed as table is used.

Figure 5:
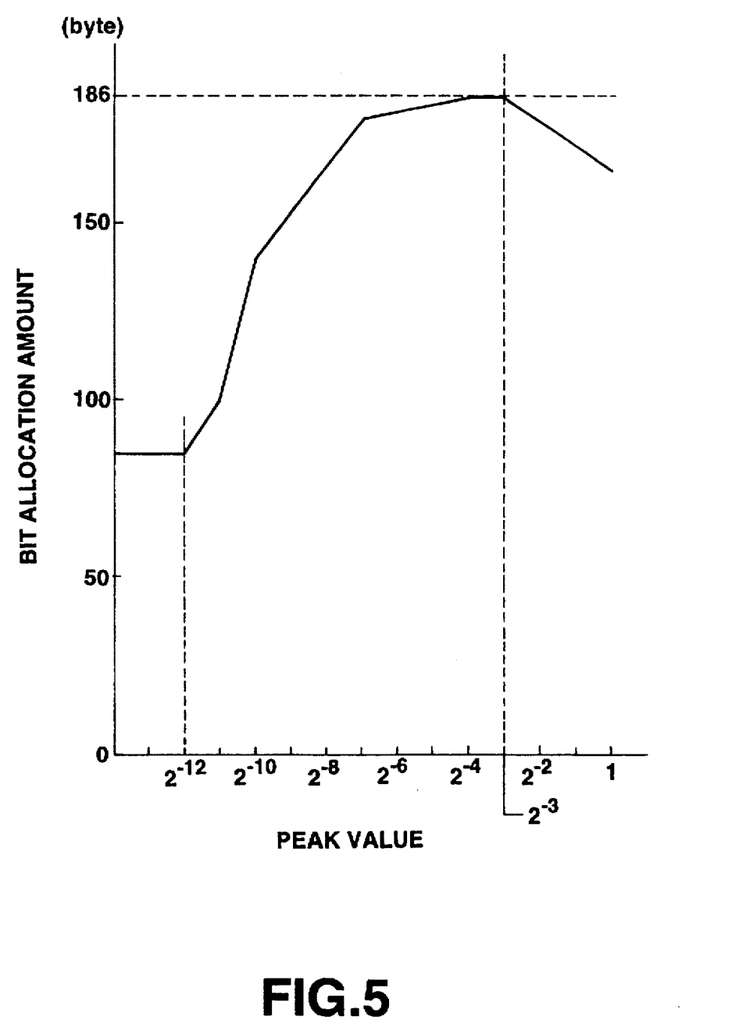
FIG. 5 is a graph for explaining bit allocation amount in the first embodiment.

The graph of FIG. 5 is a graph for converting bit allocation amount with respect to the peak value. It should be noted that graph of conversion of bit allocation amount shown in FIG. 5 is a graph in the case where so called ATRAC system is employed as the encoding system.

In FIG. 5, the abscissa represents peak value of an input signal and maximum value which can take is normalized into 1.

Moreover, the ordinate represents bit allocation amount, and maximum allocation amount is set to 186 bytes. This value is equal to information amount of one sound frame of the ATRAC system in so called MD (Mini Disc) device.

The conversion graph shown in FIG. 5 is determined by conducting an experiment by using various audio signals.

In FIG. 5, the entire tendency of bit allocation amount is such that bit allocation amount increases with increase in peak value, but changes in a decrease direction when the peak value is above the minus third power of 2.

This is based on the experimental result which demonstrates that when the signal level is sufficiently large (remarkably large), quantizing noise from re-quantization is masked by signal level, sound is difficult to be heard even if amount of injected re-quantizing noise is increased.

On the other hand, in FIG. 5, in the case where signal level is sufficiently small (remarkably small), for example, the peak value is less than the minus 12th power of 2, the bit allocation amount is caused to be fixed (flat bit allocation). This is because since bit amount necessary for respective parameter information (word length data or scale factor data, etc. shown in FIG. 4) of the ATRAC system is substantially fixed, it is necessary to ensure bit amount to some degree.

Moreover, since when the level is lowered, random noise (white noise) can be heard and such a signal has a tendency such that the frequency components are uniformly distributed over the entire frequency band, a large amount of bits are required although the level is small.

As stated above, the relationship between bit allocation amount and peak value is caused to be non-linear (substantially S-shaped curve). Namely, unless the hearing sense characteristic is taken into consideration, the relationship between bit allocation amount and peak value is a proportional relationship. However, in this invention, there is employed a scheme in which while maintaining the minimum bit allocation amounts for every respective channel, bit allocation amount is decreased in the case where the level is above a predetermined level.

At step S64, judgment as to whether or not the entire bit amount is fixed is made. When it is judged at this step S64 that it is necessary to allow total bit allocation amount of all channels to be fixed, the processing operation proceeds to step S65. After the above-mentioned conversion is completed, calculation of the formula (1) which will be later is carried out to calculate the ultimate bit allocation amounts for every respective channels.

Namely, when it is assumed that total bit allocation amount per one sound frame of a system of n channels is G and bit allocation amount by conversion is Ci (i=1, 2, . . . , n), the ultimate bit allocation amount Si allocated to each channel is expressed as follows:

$$Si=G*Ci/(C1+C2+\ldots+Cn) \quad (1)$$

After processing at the step S65, or after it is judged at the step S64 that the entire bit amount is not fixed, the processing operation proceeds to step S66 to complete the processing.

Formatter of FIG. 1 and deformatter 700 of FIG. 2 are caused to be in correspondence with ATRAC system as described above, whereby they operate as described below.

Formatter 600 of FIG. 1 places, in order of channels, data sent in a format as shown in FIG. 4 from encoding elements $400_1 \sim 400_n$ of respective channels every one sound frame to transmit it as bit stream. Namely, this formatter 600 serves as multiplexer.

Further, deformatter 700 of FIG. 2 serves as demultiplexer to decompose data multiplexed at the formatter 600 every respective channels to send (transfer) them to respective decoding elements $400_1 \sim 400_n$.

As described above, in accordance with the device (encoder/decoder) of the first embodiment according to this invention, in compression of audio data having a plurality of channels, bit allocation amounts to respective channels are determined by changes in point of time of amplitude information of respective channels to encode audio data. For this reason, bit allocation in correspondence with information amounts can be made with respect to respective channels. Thus, more efficient coding can be made.

Namely, realization of higher sound quality or realization of low bit rate in total of all channels can be made. It should be noted that since there are instances where fixed length is desired in dependency upon medium recorded coding may be carried out in the device of the first embodiment in a manner to allow total bit allocation amount of all channels to be approximately fixed.

A second embodiment of this invention will now be described.

Figure 7:
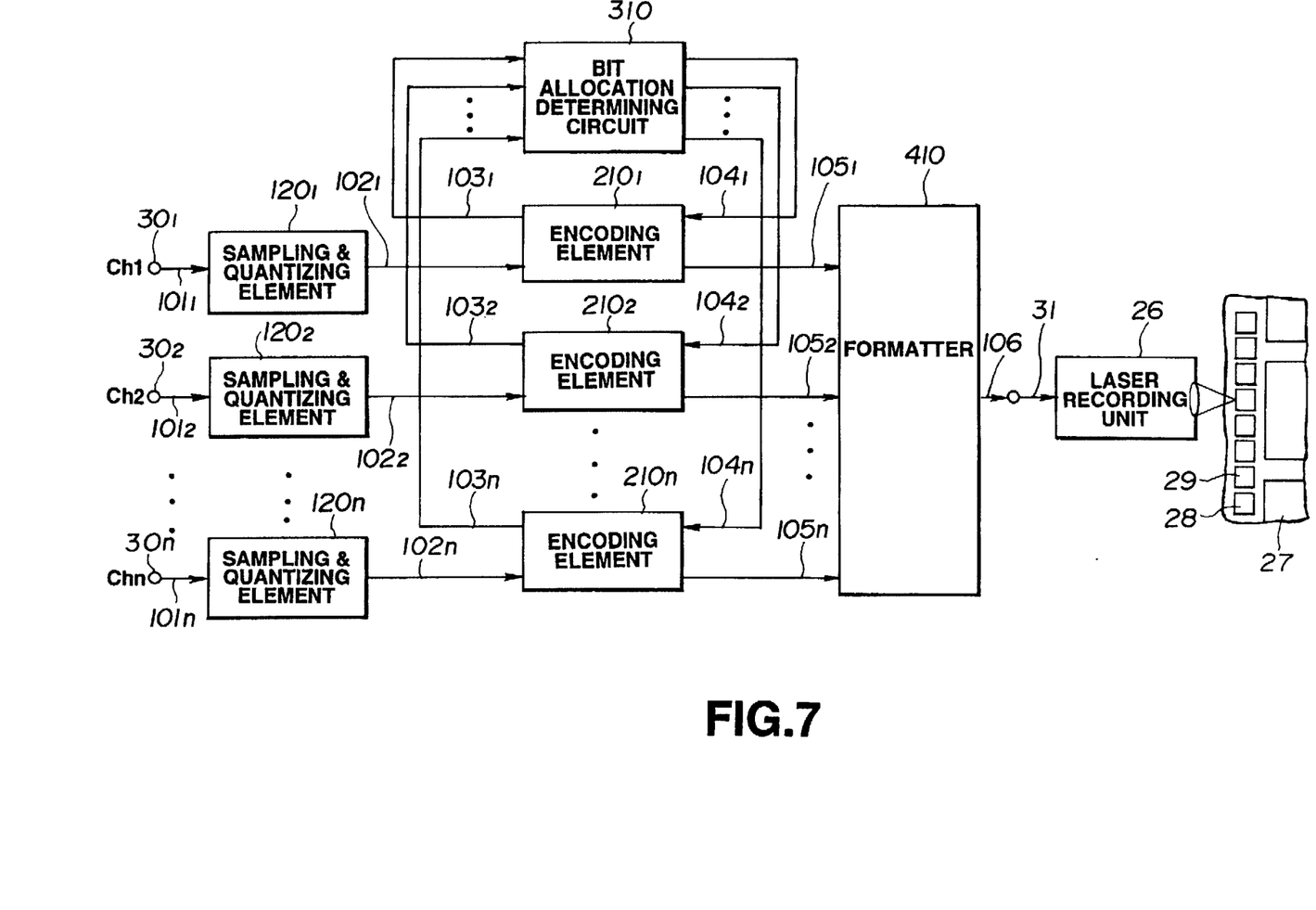
FIG. 7 is a circuit diagram showing, in a block form, outline of the configuration of a low bit rate encoder of a second embodiment according to this invention.

The configuration of a low bit rate encoder of the second embodiment is shown in FIG. 7.

In FIG. 7, audio signals of a plurality of channels (ch1, ch2, . . . , chn) are sent to sampling and quantizing elements $120_1 \sim 120_n$ corresponding to respective channels via input terminals $30_1 \sim 30_n$ and transmission lines $101_1 \sim 101_n$ corresponding to respective channels. At these sampling and quantizing elements $120_1 \sim 120_n$, audio signals of respective channels are converted into quantized signals. These quantized signals from the respective sampling and quantizing elements $120_1 \sim 120_n$ are sent to respective coding elements $210_1 \sim 210_n$ via transmission lines $102_1 \sim 102_n$.

At respective coding elements $210_1 \sim 210_n$, audio signals of respective channels are divided into signals in two-dimensional regions of time and frequency (block floating units) to normalize signal components belonging to block floating units by using scale factors every block floating units. Scale factors of respective block floating units thus determined are sent to bit allocation determining circuit 310 through transmission lines $103_1 \sim 103_n$.

This bit allocation determining circuit 310 determines a sum total for every respective channel using scale factors which have been received through transmission lines $103_1 \sim 103_n$ to calculate (determine) bit allocation amounts of respective channels from the sum total by conversion formula (graph of conversion) which will be described later to send (transfer) the bit allocation amounts from transmission lines $104_1 \sim 104_n$ to coding elements $210_1 \sim 210_n$.

Accordingly, respective coding elements $210_1 \sim 210_n$ re-quantize signals from the transmission lines $102_1 \sim 102_n$ in dependency upon the bit allocation amounts to send (transfer) the re-quantized, i.e., compressed signals to formatter 410 through transmission lines $105_1 \sim 105_n$.

The formatter 410 composes the compressed signals received via the transmission lines $105_1 \sim 105_n$ of a plurality of channels into bit stream for transmission or recording onto recording medium in accordance with a predetermined format. This bit stream is outputted from output terminal 31 through transmission line 106.

Further, this bit stream is written into predetermined recording areas 28 on cinema film 27 by, e.g., laser recording unit 26.

It should be noted that since the fundamental configuration of low bit rate decoder in the second embodiment is similar to that of FIG. 2, the detailed explanation is omitted.

This decoder will now be briefly described with reference to FIG. 2. Deformatter 700 of low bit rate decoder of the second embodiment also decomposes bit stream from low bit rate encoder of the second embodiment into compressed signals for every respective channel in accordance with a predetermined format.

The compressed signals decomposed for every respective channels are expanded at decoding elements $800_1 \sim 800_n$ correspondingly provided for every respective channels, and are then converted into analog signals at D/A (digital/analog) converters $900_1 \sim 900_n$. These analog signals are outputted as decoded signals of respective channels Ch1~Chn.

The compression-encoding technique utilized in the low bit rate encoder of the second embodiment can be applied to all systems in which compression-encoding is carried out by using scale factors.

Namely, when there is employed, also in the second embodiment, the configuration in which output of bit allocation determining circuit 310 of FIG. 7 is connected to bit allocation element 405 of FIG. 3, a variable length encoder can be constituted.

The detailed operation of bit allocation determining circuit 310 of FIG. 7 connected to bit allocation element 405 of FIG. 3 will now be described with reference to the graph of FIG. 8 and the flowchart of FIG. 9.

Figure 9:
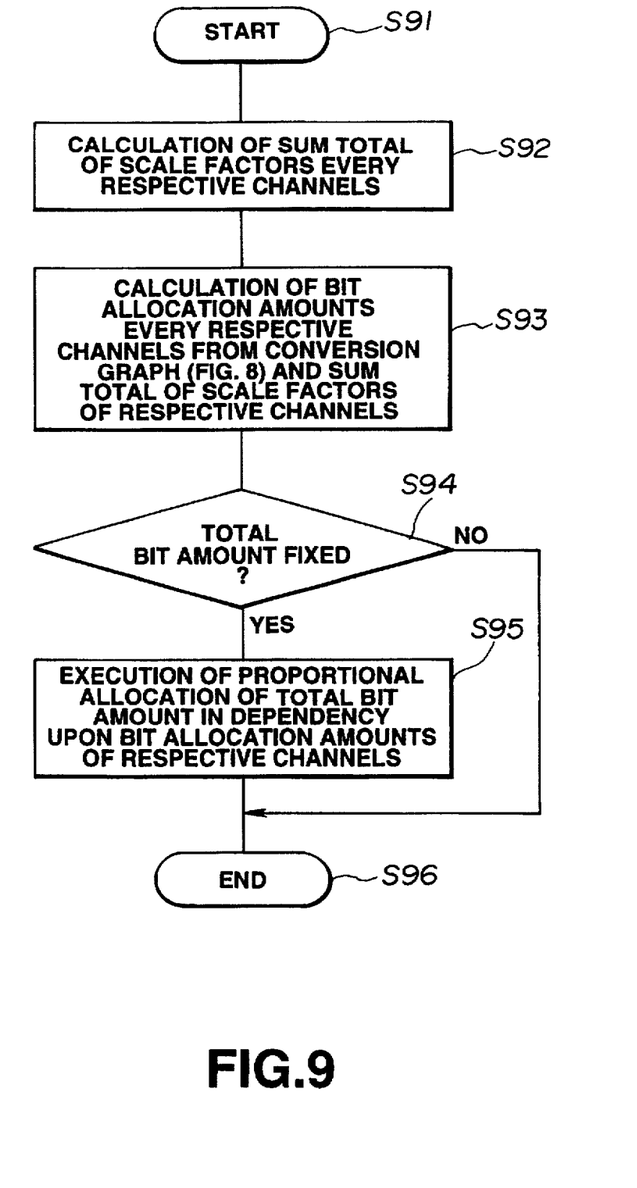
FIG. 9 is a flowchart for explaining the operation of determination of bit allocation amount in the second embodiment.

Initially, when processing operation is started at step S91 of FIG. 9, bit allocation determining circuit 310 calculates a sum total of scale factors for every respective channels from scale factors from encoding elements $210_1 \sim 210_n$ at step S92.

At the subsequent step S93, bit allocation amounts for every respective channel are calculated from the determined sum total of scaling factors of respective channels.

Here, scale factors are values which have normalized frequency components included in 52 block floating units as previously described. Ordinarily, an approach is employed to determine absolute values of frequency components within corresponding block floating unit to select, from values shown in the Table 4, minimum one of values more than the maximum value of those absolute values.

Namely, it is considered that the scale factor indicates a representative character of data within block floating unit, i.e. energy. Accordingly, it is considered that if sum of scale factors is determined, it is possible to estimate the entire information amount.

Figure 8:
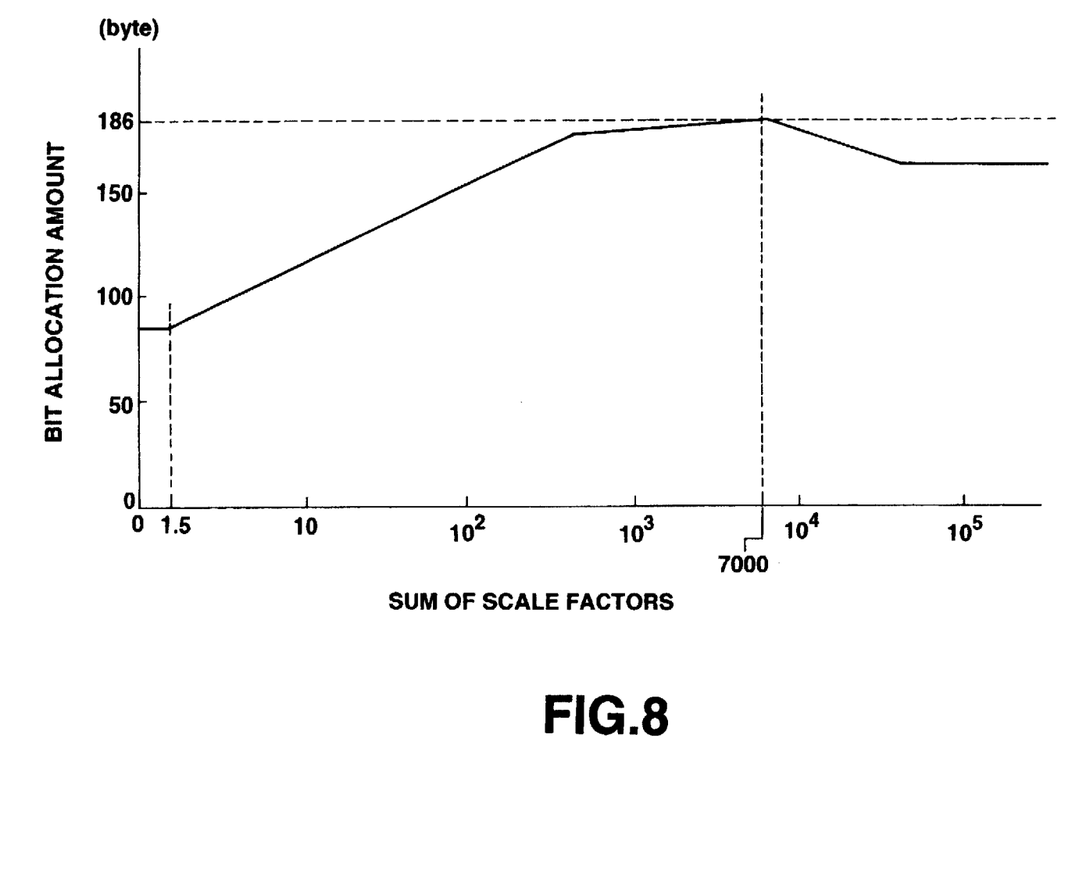
FIG. 8 is a graph for explaining bit allocation amount in the second embodiment.

Bit allocation amount with respect to sum of scale factors at bit allocation determining circuit 310 of FIG. 7 is shown in FIG. 8.

Also in FIG. 8, ATRAC system is used as the encoding system similarly to the first embodiment. In FIG. 8, the ordinate represents bit allocation amount (maximum allocation amount is 186 bytes) similarly to FIG. 5, and the abscissa represents the sum of scale factors.

The conversion graph shown in FIG. 8 is determined while conducting experiments by using various audio signals similar to FIG. 5 of the first embodiment.

The entire tendency is that as the value of sum of scale factors increases, bit allocation amount also increases.

However, in FIG. 8, when value of sum of scaling factors is above about 7000, bit allocation amount changes in a decreasing direction. This is based on the experimental result that since signal level is relatively large at bit allocation amount where value of sum of scale factors is remarkably large (signal level is sufficiently large), and quantization noise by requantization is masked by the signal level, the signal is difficult to hear even if amount of injected of re-quantization noise is increased.

On the other hand, when value of sum of scale factors is less than 1.5 (in the case where signal level is sufficiently small), bit allocation amount is fixed, since bit amount necessary for respective parameter information of the ATRAC system (word length data or scale factor data, etc. shown in the FIG. 4) is substantially fixed, it and is necessary to ensure this bit amount.

Also in this example, the relationship between bit allocation amount and sum total of scale factors represents non-linear characteristic of a substantially S-shaped curve.

Also in the second embodiment, at step S94, judgment as to whether or not the entire bit amount is fixed is carried out. When it is judged at this step S94 that it is necessary to allow total bit allocation amount of all channels to be fixed, the processing operation proceeds to step S95. After the above-mentioned conversion is completed, calculation of the formula (1) is carried out to calculate the ultimate bit allocation amounts every respective channels.

After processing at the step S95, or after it is judged at the step S94 that the entire bit amount is not fixed, the processing operation proceeds to step S96.

Also in the second embodiment, formatter 410 of FIG. 7 places, in order of channels, data sent in a form as shown in FIG. 4 from encoding elements $210_1 \sim 210_n$ of respective channels every one sound frame to transmit it as bit stream. Namely, this formatter 410 serves as a multiplexer.

Further, deformatter in the low bit rate decoder of the second embodiment also serves as a demultiplexer to decompose data of every respective channel multiplexed at the formatter 410 to send (transfer) them to respective decoding elements.

As described above, in accordance with the device (encoder/decoder) of the second embodiment, in compression of audio data having a plurality of channels, an approach is employed to determine bit allocation amounts of respective channels by change in point of time of sum total of scale factors of respective channels to encode audio data. For this reason, bit allocation corresponding to information amounts can be implemented to respective channels. Thus, more efficient encoding can be made.

By such improvement in coding, higher sound quality or lower bit rate can be realized. Namely, also in the second device of this embodiment, realization of lower bit rate or higher sound quality in total over the entire channel can be made.

Further, also in the case of the second embodiment, there are instances where data has fixed length in dependency upon medium recorded. In that case, encoding can be made so that total bit allocation amount of all channels is approximately fixed.

In the above-described first and second embodiments of this invention, cinema film was exemplified as a recording medium. However, as a recording medium, not only cinema film, but also various media can be used within the range which does not depart from the gist of this invention. For example, optical disc and magnetic tape, etc. may be used.

In this invention, since bit allocation amounts to respective channels are determined by energies, e.g., amplitude information or change in point of time of sum total of scale factors of respective channels, bit allocation corresponding to information amount can be implemented for respective channels. As a result, more efficient coding can be made. Thus, higher sound quality at a lower bit rate can be realized.

In addition, audio signals of multi-channel system in this invention refer to at least 2 channels, and the effect of this invention is conspicuous desirably in the case where the number of channels is 5 channels or more, as with a sound track of a cinema.

What is claimed is:

1. A low bit rate encoder adapted for compression-encoding digital audio signals of a plurality of channels, the low bit rate encoder comprising:

energy detecting means for detecting energies of the digital audio signals of each respective channel;

bit allocation amount determining means for determining bit allocation amounts for the respective channels on the basis of the detected energies;

compression-encoding means for compression-encoding the digital audio signals on the basis of the bit allocation amounts allocated to the respective channels; and multiplexing means for multiplexing the compression-encoded digital audio signals of the respective channels, the bit allocation amount determining means operative to determine bit allocation amounts so that the relationship between the energy and the bit allocation amount of the digital audio signals represents a non-linear characteristic based upon human hearing sense such that, as energy of the digital audio signals increases, the bit allocation amounts, as a whole, increase, wherein the non-linear characteristic of the bit allocation amount determining means is approximated by a substantially S-shaped curve, beginning at a low bit allocation amount for a first energy level, increasing to a higher bit allocation amount for a second energy level higher than the first energy level, and decreasing to a bit allocation lower than the higher bit allocation amount for a third energy level higher than the second energy level.

2. A low bit rate encoder adapted for compression-encoding digital audio signals of a plurality of channels, the low bit rate encoder comprising:

energy detecting means for detecting energies of the digital audio signals of each respective channel;

bit allocation amount determining means for determining bit allocation amounts for the respective channels on the basis of the detected energies;

compression-encoding means for compression-encoding the digital audio signals on the basis of the bit allocation amounts allocated to the respective channels; and multiplexing means for multiplexing the compression-encoded digital audio signals of the respective channels, the bit allocation amount determining means operative to determine bit allocation amounts so that the relationship between the energy and the bit allocation amount of the digital audio signals represents a non-linear characteristic based upon human hearing sense such that, as energy of the digital audio signals increases, the bit allocation amounts, as a whole, increase, wherein the non-linear characteristic of the bit allocation amount determining means is such that, when energy of the digital audio signal is sufficiently large, the bit allocation amount decreases.

3. A low bit rate encoding method of compression-encoding digital audio signals of a plurality of channels, the method comprising the steps of:

detecting energies of the digital audio signals of each respective channel;

determining bit allocation amounts for the respective channels on the basis of the detected energies;

compression-encoding the digital audio signals on the basis of the bit allocation amounts allocated to the respective channels; and multiplexing the compression-encoded digital audio signals of the respective channels, wherein, in the step of determining bit allocation amounts, the relationship between energy and bit allocation amount of the digital audio signals represents a non-linear characteristic based upon human hearing sense such that, as energy of the digital audio signals increases, the bit allocation amounts, as a whole, increase, wherein the non-linear characteristic is approximated by a substantially S-shaped curve, beginning at a low bit allocation amount for a first energy level, increasing to a higher bit allocation amount for a second energy level higher than the first energy level, and decreasing to a bit allocation lower than the higher bit allocation amount for a third energy level higher than the second energy level.

4. A low bit rate encoding method of compression-encoding digital audio signals of a plurality of channels, the method comprising the steps of:

detecting energies of the digital audio signals of each respective channel;

determining bit allocation amounts for the respective channels on the basis of the detected energies;

compression-encoding the digital audio signals on the basis of the bit allocation amounts allocated to the respective channels; and multiplexing the compression-encoded digital audio signals of the respective channels, wherein, in the step of determining bit allocation amounts, the relationship between energy and bit allocation amount of the digital audio signals represents a non-linear characteristic based upon human hearing sense such that, as energy of the digital audio signals increases, the bit allocation amounts, as a whole, increase, wherein the non-linear characteristic is such that, when energy of the digital audio signal is sufficiently large, the bit allocation amount decreases.

* * * * *